July 5, 1966  C. S. ODSON  3,259,720
THERMOSTATIC CONTROL WITH MANUAL RESET
Filed July 12, 1963  2 Sheets-Sheet 1

INVENTOR.
CLIFFORD S. ODSON
BY
ATTORNEYS

July 5, 1966  C. S. ODSON  3,259,720

THERMOSTATIC CONTROL WITH MANUAL RESET

Filed July 12, 1963  2 Sheets-Sheet 2

INVENTOR.
CLIFFORD S. ODSON
BY
ATTORNEYS

United States Patent Office
3,259,720
Patented July 5, 1966

3,259,720
THERMOSTATIC CONTROL WITH MANUAL RESET
Clifford S. Odson, Mansfield, Ohio, assignor to Therm-O-Disc, Incorporated, Mansfield, Ohio, a corporation of Ohio
Filed July 12, 1963, Ser. No. 294,592
4 Claims. (Cl. 200—138)

The present invention relates to a manually reset, thermally actuated control and more particularly to a thermostatic control for protecting electrical equipment against overheating, having normally closed switch members that remain in open position after being opened by the thermostatic element until the reset button is depressed and which members cannot be maintained in a closed position by said reset button.

Heretofore, thermostatically controlled switches have been employed extensively to protect clothes driers, electric motors, hot water heaters and other equipment against damage due to overheating, but such devices were not entirely satisfactory, particularly because of the tendency for irresponsible operators to secure the manually reset button in such positions as to maintain the contacts of the switch in closed position. Thus, the operator would use the reset button to bypass the function of the switch and continue operation of the equipment when it was subject to overheating.

During the last decade, various thermostatic controls have been designed in an attempt to solve this problem, but they have not been completely satisfactory for many reasons. Thus, they were complicated in structure, expensive to manufacture, were unreliable or lacking in durability or versatility. Some failed to operate after being subjected to periods of vibration.

The present invention provides a solution to the foregoing problems in a very simple and reliable manner while at the same time reducing the cost of the control and, therefore, represents a significant advance in the art. The simplest and preferred control according to the invention comprises a housing having an over-center snap-acting switch arm actuated by a bimetal thermostatic disc, which snaps between two stable positions of opposite concavity, and a reset button for depressing the switch arm and causing it to snap back to its normally closed position. Stop means are provided for limiting the downward movement of the reset button to permit opening of the switch contacts by the thermostatic disc even when the reset button is maintained in fully depressed position. Thus, the switch cannot be held in closed position when the thermostatic disc is subjected to a predetermined elevated temperature. The novel combination of the snap-acting switch arm, the snap-acting thermostatic disc and the reset button provides a superior thermostatic control which is not effected by vibration, which has the positive control needed for maximum protection of the equipment, and which may be used for many different applications because of the many different thermostatic discs which may be used. The control of this invention is particularly well suited for applications where very slight changes in temperature effect opening of the switch, but essentially the same equipment is also well suited for other applications where large temperature differentials are necessary to operate the thermostatic disc.

An object of the present invention is to provide a simple, inexpensive, thermally actuated switch having a reset button which cannot be employed to maintain the switch in closed position when the equipment is overheated.

A further object of the invention is to provide a thermostatic control which may be operated by very small changes in temperature but which is opened and closed in a positive manner and is not effected by vibration.

Another object of the invention is to provide a thermostatic control having a minimum number of parts, which can be manufactured at minimum cost and can readily be assembled or disassembled.

Other objects, uses and advantages of the invention will become apparent to those skilled in the art from the appended claims and the following detailed description of the drawings wherein like reference characters denote corresponding parts throughout the several views and wherein:

Figure 6:
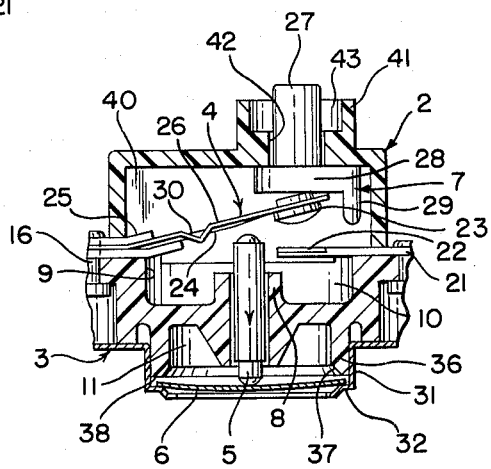
Figure 7:
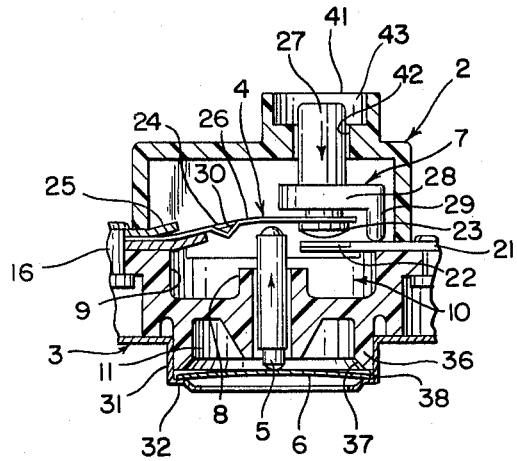

FIGURE 6 is a fragmentary transverse vertical sectional view showing the position of the control when the contacts are open but the disc has reversed its concavity from that shown in FIGURE 6, and FIGURE 7 is a fragmentary transverse vertical sectional view showing the position of the parts of the control when the reset mechanism is fully depressed and the bimetal disc is in switch opening position.

Referring more particularly to the drawings, there is illustrated a preferred form of my novel thermostatic control assembly which comprises a one-piece base 1, a one-piece cover 2 rigidly mounted on said base, a sheet metal mounting plate 3, rigidly mounted on the bottom face of said base, a movable contact arm 4 mounted in cantilever fashion on the top face of said base, a cylindrical bumper or pin 5 slidably mounted at the center of the base, a bimetallic disc 6 peripherally mounted between said base and said mounting plate for moving said bumper axially toward and away from said contact arm to open the normally-closed contacts when said disc is heated above a predetermined temperature, and a reset button 7 mounted for vertical movement in the cover 2 in a direction parallel to the direction of movement of the bumper 5. Since the general construction of the assembly is quite similar to that disclosed in United States Patent No. 3,081,388, granted March 12, 1963, the construction of the parts will become readily apparent to those skilled in the art. The base 1, the cover 2 and the reset button 7 are made of a suitable electrical insulating material having a substantial resistance to heat. Such material may be a phenolic condensation product or any other suitable material commonly used for thermostatic controls of this general type. The bumper 5 may also be formed of such a material.

The base 1 is quite similar to the plastic base of the thermostatic control shown in the aforesaid patent and has a central boss 8 which is generally cylindrical in configuration and coaxial with the cover 2. The bumper 5 and the annular wall portion 9 are located below the margin of said cover 2. The central boss 8 and the wall portion 9 of the base 1 define an annular chamber 10 in the top portion of the base, and said base is provided with an annular bottom recess 11 below and coaxial with said chamber.

The base 1 has rectangular portions 12 at opposite sides thereof and flat horizontal flanges 13 with a series of tab-receiving recesses 14 substantially as shown in said patent. The rivet openings 15 of the rectangular portions 12 are necessary to permit use of the rivets 16 to mount the terminal members 17 and 18. Said terminal members are rigidly mounted on the flat upper surface of the base 1 and are bent upwardly at the ends to provide means for mounting the conventional terminal screws 19 and 20. The member 18 has a horizontal contact-carrying portion 21 within the chamber 10 which carries a fixed contact surface 22 and the arm 4 has a contact button 23 rigidly mounted on its free end for movement into and out of engagement with the fixed contact surface. The spring arm 4 is an over-center snap-acting arm which snaps between two stable positions of equilibrium. The details of said arm are described hereinafter. One flat horizontal portion of the arm 4 is clamped between the terminal member 17 and an arm support member 25 to provide a rigid cantilever support for the arm.

The reset button 7 has a cylindrical portion 27 and an enlarged portion 28 perpendicular to the axis of the portion 27 and having an offset projection 29. The portion 29 is straight and perpendicular to the terminal member 18 and the arm 4, which extends between said terminal and the opposite terminal member 17, and said portion 29 has a semi-cylindrical bottom surface which is engageable with the flat upper surface of the terminal member 18 along a straight line perpendicular to said member. The reset button rests on the member 18 when the switch is closed as shown in FIGURE 2 and is held in such position by gravity until the arm 4 is snapped to uppermost position as shown in FIGURES 5 and 6.

Figure 1:
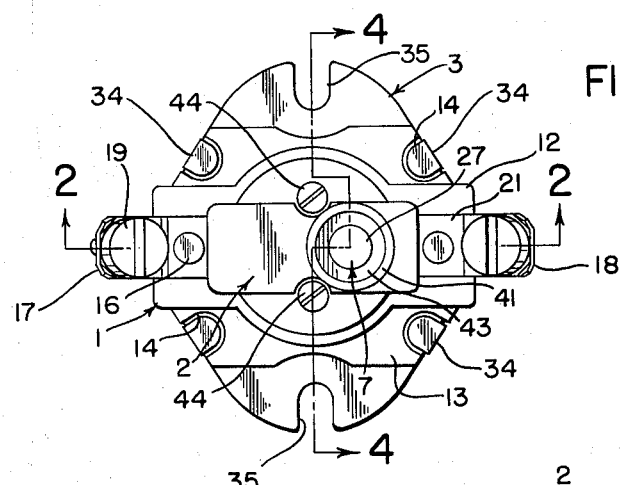
FIGURE 1 is a top plan view of a thermostatic control embodying the present invention.

The central circular portion 31 of the sheet metal mounting plate 3 is concentric to the disc 6 and the bumper 5 and is dished out to provide a cylindrical holder for the disc and to locate the mounting plate on the annular portion 36 of the base 1. The plate has four tabs 34 which are bent around the flanges 13 into the recesses 14 to hold the mounting plate rigidly in the base. The opposite end portions of the mounting plate project beyond the flanges 13 as shown in FIGURE 1 and have conventional mounting holes 35 therein.

Figure 2:
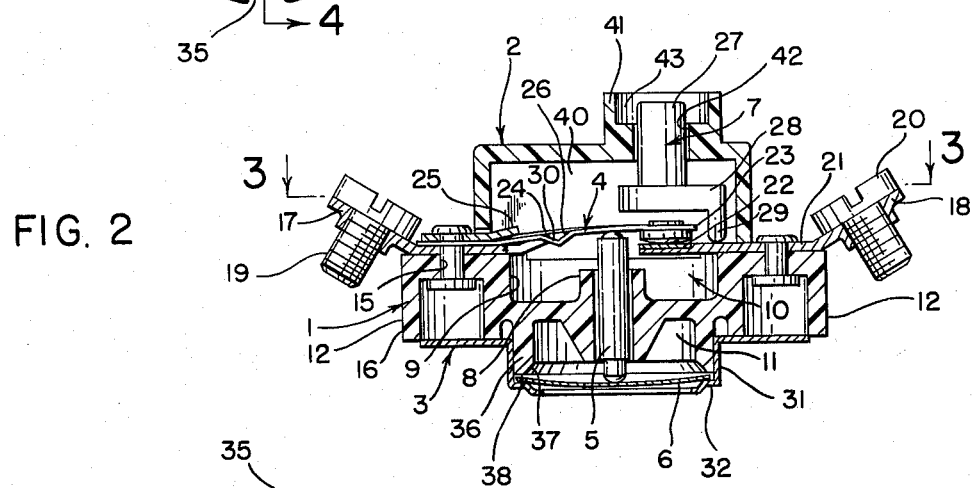
FIGURE 2 is a longitudinal vertical sectional view taken on the line 2—2 of FIGURE 1 showing the elements of the switch in closed position.
Figure 3:
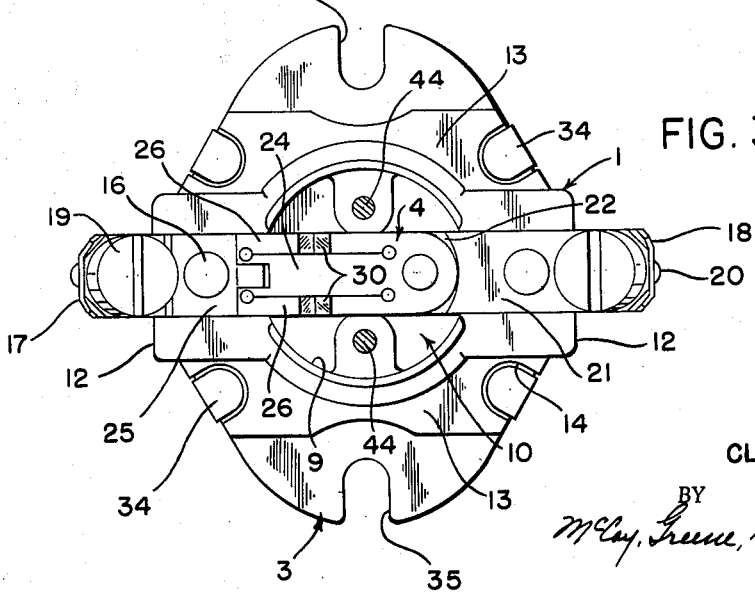
FIGURE 3 is a horizontal sectional view taken on the line 3—3 of FIGURE 2.
Figure 4:
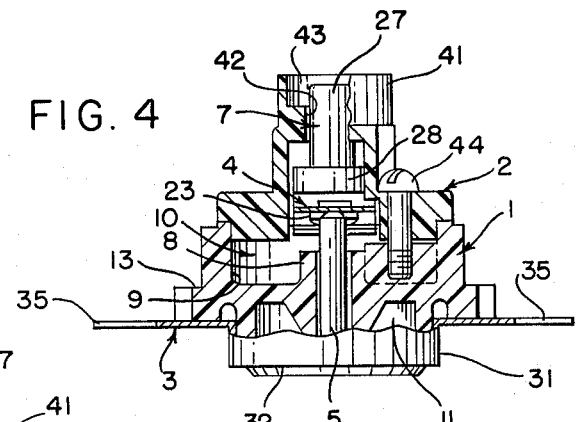
FIGURE 4 is a transverse vertical sectional view taken on the line 4—4 of FIGURE 1.
Figure 5:
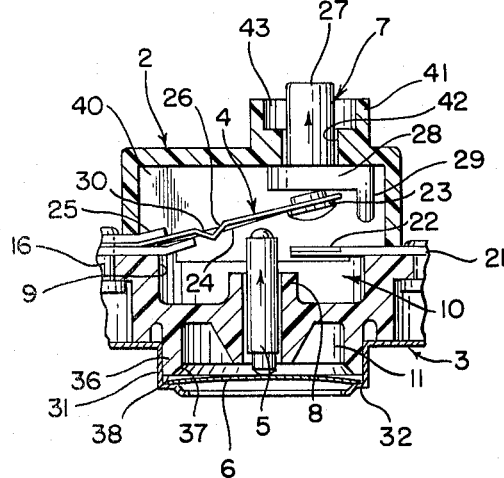
FIGURE 5 is a fragmentary transverse vertical sectional view showing the position of the parts of the control when the contacts are open.

The disc-shaped composite thermal plate 6 may be a conventional bimetallic snap-acting thermostatic element which moves from one stable position when cold as shown in FIGURES 2 and 6, to another relatively stable position when hot as shown in FIGURES 5 and 7. The disc is constructed to snap from its lowermost position to an uppermost position of opposite concavity when heated to a temperature above a predetermined range and to snap back to its lowermost position when cooled to a temperature below said range. The control assembly of this invention is particularly well suited for use with bimetallic discs which require only a small temperature change to effect snapping of the disc.

The cover 2 provides the means for locating and guiding the reset button and has a rectangular recess 40 which cooperates with the chamber 10 to provide a space for receiving the reset button and for permitting upward movement of the contact arm 4. The cover has an offset cylindrical bore 42 for receiving the cylindrical portion 27 of the reset button and an annular portion 41 projecting above the cover to provide a recess 43 for receiving the upper end of the reset button. The annular projecting portion 41 provides a barrier for protection of the reset button, but is unnecessary to obtain the advantages of this invention. The cover is rigidly and detachably connected to the base 1 by retaining screws 44 or other suitable means, the cover 2 and the base 1 forming a non-conductive non-metallic housing for the electrical elements.

If desired, the thermostatic control of this invention may be constructed as shown in the drawings which are drawn substantially to scale, but it will be apparent that the size, shape and arrangement of the parts may be varied considerably.

For many years over-center snap-acting arms having two stable positions of equilibrium have been used in temperature-responsive bimetal control devices, but such devices were omitted when using a different type of bimetallic element, such as a disc-type element. It has now been discovered that a far superior thermostatic control assembly may be obtained by using a temperature-responsive bimetallic disc in combination with a simple over-center snap-acting arm and a reset button. This combination is quite different from any previously known in the thermostatic control art and greatly advances the art.

The snap-acting arm 4 of this invention is different from the usual bimetallic snap-acting arm because it is actuated by the bumper 5 or the reset button 7 rather than by expansion or contraction of the metal forming the arm, but the principle of operation of the snap-acting arm is nevertheless apparent from the drawings. The arm shown herein is made from a single flat strip of a suitable resilient metal alloy such as a beryllium-copper alloy or other conventional spring-type metal. The strip has a uniform width and thickness and is cut and bent to form a bowed central portion 24 with a width less than that of the strip and two bent side portions 26 on opposite sides of the portion 24.

As herein shown each side portion 26 has a V-shaped portion 30 bent downwardly toward the disc 6 to reduce the effective length of said portion 26 and the portion 24 is bowed upwardly to form yieldable means for holding the contact button 23 against the fixed contact surface 22. Since each portion 26 has an effective length less than that of the portion 24, said portion 24 is bowed and has two positions of equilibrium. The arm 4 is under some stress when the switch is closed so that vibrations of the assembly cannot cause the switch to open accidentally and a substantial force is required to snap the arm to its uppermost open position, but the disc 6 is able to provide such force and to move the arm 4 upwardly a distance sufficient to cause it to snap from its normally closed position to such open position. The arm snaps to such open position as the portion 24 reverses its curvature, and the portions 26 prevent the portion 24 from returning to its original position and hold the arm 4 in the open position until a substantial downward force is applied to the arm by the reset button 7. The assembly may, therefore, be subjected to vibration without accidental closing of the switch.

The reset button 7 shown herein may be held in a depressed position and will then prevent the arm 4 from reaching its uppermost stable position, but it does not prevent opening of the switch by the disc 6 and the bumper 5.

It is believed that that the operation of the thermostatic control assembly of this invention will become apparent to those skilled in the art from the drawings. It will be noted that the disc 6 is peripherally mounted on the seat provided by the flat annular portion 32 of the plate 3 and is located in the concave lowermost position when its temperature is below a predetermined amount so that the bumper 5 is out of contact with the arm 4. The frustro-conical surface 37 and the flat annular surface 38 of the annular portion 36 provide a knife edge to facilitate snapping of the disc 6 from its lowermost position to its uppermost position of opposite concavity. The marginal portion of the disc is held in its proper position by the parallel surfaces at 32 and 38 and by the cylindrical outer part of the portion 31. This particular construction is particularly advantageous because of the ease of assembly.

It will be noted that the stop member 29 limits the downward movement of the reset button 7 and thereby provides a substantial clearance between the bottom surface of the button portion 28 and the upper surface of the contact 23 (FIGURE 7) whereby said contact is free to move out of engagement with the fixed contact surface 22 when the reset button is fully depressed. This novel construction permits opening of the switch by the thermostatic element 6 when the temperature is excessive whether or not the reset button is in its maximum depressed position, thereby preventing an irresponsible operator from using the reset button to hold the switch closed.

The over-center arm 4 is constructed so as to have two positions of stable equilibrium so that it can be snapped open by the thermostatic disc 6 and so that it will overcome the weight of the reset button and maintain the switch in open position until the reset button is depressed. Thus, snap-acting means are provided for raising the mobile contact 23 and the free end of the arm 4 to a stable open position and for yieldably resisting downward movement out of said open position against the weight of the reset button. Snap-acting means are also provided for moving said mobile contact from said stable open position to its normal closed position in response to the depression of said reset button and for yieldably holding the switch in closed position to prevent opening of the switch by vibration. The switch is thus held open and will not close accidentally after cooling of the disc 6 until such time as the reset button is depressed to initiate operation of the equipment. This is important since it is usually necessary for the operator to locate the trouble in the equipment which caused the overheating before he restarts the equipment. This eliminates the need for another start button or other equipment which could add substantially to the overall cost of the equipment. The snap-acting arm 4 permits maximum movement of the mobile contact 23 with a minimum movement of the reset button, and permits use of a thermostatic disc which provides very little axial movement for the bumper 5. In other words, the snap-acting arm provides maximum opening movement of the switch with minimum movement of the bumper.

It will be understood that the above description is by way of illustration rather than limitation and that, in accordance with the provisions of the patent laws, variations and modifications of the specific devices described herein may be made without departing from the spirit of the invention.

Having thus described my invention, I claim:

1. A thermostatic control comprising a housing forming a switch chamber, an electric switch in said housing having a mobile contact and a fixed contact, a snap-acting arm of flexible metal mounted on said housing and carrying said mobile contact, said arm having two stable positions and yieldably resisting movement out of either of said positions, said mobile contact being held against said fixed contact by said arm when the arm is in one of said stable positions and being held out of contact with said fixed contact when the arm is snapped to the other of said positions, means for actuating the arm to snap it to said other of said positions comprising a bimetallic disc peripherally mounted in said housing and a bumper connected between said arm and the central portion of said disc, and reset means slidably mounted in said housing for engaging said arm to snap it to said one of said positions.

2. A thermostatic control comprising a housing, a normally-closed switch in said housing having a mobile contact and a fixed contact, an over-center snap acting arm mounted in said housing and having a free end carrying said mobile contact, said arm comprising a thin flexible metal strip having means biasing said arm toward a closed position wherein said mobile contact engages said fixed contact and yieldable means on said arm for holding said arm in a retracted open position wherein said mobile contact is out of engagement with said fixed contact, a bi-metal thermostatic disc peripherally mounted on said housing below said arm, a bumper extending upwardly between the central portion of said disc and an intermediate portion of said arm to translate the movement of said disc to said arm and to open said switch in response to movement of said disc, said disc being constructed to cause movement of said arm to said open position in response to an increase in temperature above a predetermined range and to release said arm when said temperature is below said range, and reset means for applying downward pressure to said arm to return said arm to said closed position from said open position, said reset means comprising a reset button slidably mounted in the upper portion of said housing and a stop for limiting the downward movement of said reset button, said stop being located to permit an opening of said switch by said thermostatic element when said button is fully depressed.

3. In a thermostatic control device comprising a housing defining a switch chamber, a switch mounted within said chamber and including a stationary contact and an over-center snap acting arm carrying a mobile contact, a snap-acting thermostatic element mounted on said housing remote from said switch chamber and having two positions of stability, means operably connected between said arm and said thermostatic element for opening the switch when said element is in one of said positions and for permitting closing of said switch when said element is in the other of said positions, and a reset button having means for depressing said arm from its switch-opening position to its switch-closing position when said button is depressed, the improvement which comprises stop means for limiting downward movement of said reset button to permit opening and closing of said switch by said thermostatic element when said button is fully depressed, snap-acting means for raising said mobile contact and the free end of said arm to a stable open position and for yieldably resisting downward movement out of said open position against the weight of said reset button, and snap-acting means for moving said mobile contact from said stable open position to a closed position in response to manual depression of said reset button and for yeildably holding said mobile contact in said closed position.

4. A thermostatic control device comprising a housing defining a switch chamber, a pair of terminals on said housing, a normally closed switch mounted in said chamber and including a stationary contact connected to one of said terminals and an over-center snap acting arm carrying a mobile contact, said arm extending across said chamber and having one end mounted on said housing and connected to the other of said terminals, a bi-metallic thermostatic disc peripherally mounted on said housing below said arm and remote from said chamber and having two stable positions of opposite concavity, the central portion of said disc moving upwardly and downwardly between said stable positions in response to changes in the temperature of said disc, an upright bumper member slidably mounted in a guide portion of said housing for upward and downward movement and extending between an intermediate portion of said arm and the central portion of said disc to effect opening and closing of said switch by said arm, a reset button slidably mounted in the top portion of said housing above the intermediate portion of said arm and engaging the top of said arm to return the arm to its normal switch-closing position, stop means for limiting downward movement of said reset button to permit opening and closing of said switch by said thermostatic element when said button is fully depressed, snap-acting means for raising said mobile contact and the free end of said arm to a stable open position and for yieldably resisting downward movement out of said open position against the weight of said reset button, and snap-acting means for moving said mobile contact from said stable open position to a closed position in response to manual depression of said reset button and for yieldably holding said mobile contact in said closed position.

References Cited by the Examiner

UNITED STATES PATENTS

| | | | |
|---|---|---|---|
| 2,394,121 | 2/1946 | Ulanet | 200—67 |
| 2,715,167 | 8/1955 | Mertler | 200—67 |
| 3,081,388 | 3/1963 | Cox | 200—138 |
| 3,153,708 | 10/1964 | Guthrie | 200—67 |
| 3,164,702 | 1/1965 | Ruckriegel et al. | 200—138 |

BERNARD A. GILHEANY, *Primary Examiner.*

L. A. WRIGHT, *Assistant Examiner.*